US012635713B2

(12) United States Patent
Ephraim et al.

(10) Patent No.: US 12,635,713 B2
(45) Date of Patent: May 26, 2026

(54) PET FOOD COMPOSITIONS

(71) Applicant: Hill's Pet Nutrition, Inc., Topeka, KS (US)

(72) Inventors: Eden Ephraim, Lawrence, KS (US); Edem-Elikplim Folly, Lawrence, KS (US); Dennis Jewell, Lawrence, KS (US)

(73) Assignee: Hill's Pet Nutrition, Inc., Overland Park, KS (US)

( * ) Notice: Subject to any disclaimer, the term of this patent is extended or adjusted under 35 U.S.C. 154(b) by 350 days.

(21) Appl. No.: 18/034,836

(22) PCT Filed: Nov. 10, 2021

(86) PCT No.: PCT/US2021/058777

§ 371 (c)(1),
(2) Date: May 1, 2023

(87) PCT Pub. No.: WO2022/103836

PCT Pub. Date: May 19, 2022

(65) Prior Publication Data

US 2024/0016188 A1     Jan. 18, 2024

Related U.S. Application Data

(60) Provisional application No. 63/112,361, filed on Nov. 11, 2020.

(51) Int. Cl.
A23K 10/30      (2016.01)
A23K 50/40      (2016.01)

(52) U.S. Cl.
CPC .............. A23K 10/30 (2016.05); A23K 50/40 (2016.05)

(58) Field of Classification Search
CPC ................................ A23K 10/30; A23K 50/40
See application file for complete search history.

(56) References Cited

U.S. PATENT DOCUMENTS

| | | |
|---|---|---|
| 7,018,629 B2 | 3/2006 | Jacob et al. |
| 2007/0140990 A1 | 6/2007 | Fetissova et al. |
| 2009/0226558 A1 | 9/2009 | Cheek et al. |

FOREIGN PATENT DOCUMENTS

| | | | |
|---|---|---|---|
| CN | 101606592 | * | 12/2009 |
| CN | 106615690 | A | 5/2017 |
| CN | 107183392 | | 9/2017 |
| CN | 108771227 | | 11/2018 |
| CN | 109077178 | | 12/2018 |
| CN | 109329602 | | 2/2019 |

| | | | |
|---|---|---|---|
| JP | H09-172981 | A2 | 7/1997 |
| JP | H09172981 | * | 7/1997 |
| KR | 101887961 | | 9/2018 |

OTHER PUBLICATIONS

Luno et al "Emotional eating in companion dogs: Owners' perception and relation with feeding habits, eating behavior, and emotional state" Journal of Veterinary Behavior Mar. 2018, pp. 17-23 (Year: 2018).*

Zullkiflee et al "Propolis: Its Role and Efficacy in Human Health and Diseases", Molecules Sep. 19, 2022 pp. 1-21 (Year: 2022).*

Ahangari et al., 2018, "Propolis: Chemical Composition and Its Applications in Endodontics", Iranian Endodontic Journal, 13(3):285-292, https://doi.org/10.22037/iej.v13i3.20994.

Anonymous, 2018, "AniForte Propolis Extract Powder for Dogs and Cats 20g—100% Pure & Natural, Bee Propolis, Rich in Flavonoids, Vitamins and Minerals," amazon.co.uk, Retrieved from the Internet: URL:https://www.amazon.co.uk/AntiForte-Propolis-Flavonoids-Vitamins-Minerals/dp/B06XRYWT6X, pp. 1-8.

Hascik et al., "The Influence of Propolis as Supplement Diet on Broiler Meat Growth Performance, Carcass Body Weight, Chemical Composition and Lipid Oxidation Stability," ACTA Universitatis Agriculturae et Silviculturae Mendelianae Brunensis, vol. 63, 48, No. 2, (2015), pp. 411-418, http://dx.doi.org/10.11118/actaun201563020411.

International Search Report and the Written Opinion of the International Searching Authority issued in International Application PCT/US2021/058777 mailed Mar. 4, 2022, pp. 1-11.

Sakai et al., "Brazilian Green Propolis Promotes Weight Loss and Reduces Fat Accumulation in C57BL/6 Mice Fed a High-Fat Diet," Biol. Pharm. Bull., vol. 40, No. 4, (2017), pp. 391-395.

Wagh, Vijay D., "Propolis: A Wonder Bees Product and Its Pharmacological Potentials," Hindawi Publishing Corporation, Advances in Pharmacological Sciences, vol. 2013, Article ID 308249, pp. 1-11, http://dx.doi.org/10.1155/2013/308249.

Kabakci, 2022, "An Overview on the Effects of Propolis Administration in Different Branches of Livestock Production", Bee Studies, 14(2):41-46.

Egawa, Tatsuro et al., "The Protective Effect of Brazilian Propolis against Glycation Stress in Mouse Skeletal Muscle," Foods, vol. 8, Sep. 25, 2019, pp. 1-13, https://www.ncbi.nlm.nih.gov/pmc/articles/PMC6836237/.

Kato, Junichi et al., "Basic study on the influence of methylglyoxal (MG) on uric acid metabolism," Gout and Metabolism, vol. 34, No. 1, 2010, p. 50, https://www.jstage.jst.go.jp/article/gnam/34/1/34_50/_pdf/-char/ja.

(Continued)

*Primary Examiner* — Kelly J Bekker

(57) ABSTRACT

Described herein are pet food compositions comprising propolis, along with methods of making and using same. According to an aspect of the disclosure, provided is a pet food composition comprising propolis in an amount greater than about 0.1 wt. %; about 10 to about 40 wt. % of protein; about 9 to about 25 wt. % of a fat; about 10 to about 90 wt. % of a carbohydrate, wherein all weight percentages are based on the total weight of the food composition.

17 Claims, 2 Drawing Sheets

(56) <div style="text-align:center">References Cited</div>

<div style="text-align:center">OTHER PUBLICATIONS</div>

Zhang et al., 2015, "Mechanism of action of propolis against diabetes", 2015 National Bee Product Market Information Exchange Conference and China (Guangzhou) Bee Industry Expo Paper Gathering Discussion Collection, pp. 134-138, with English-language translation of parts cited in the Sep. 28, 2024 Office Action in counterpart Chinese Application No. CN 202180075931.6.

Zhang et al., 2006, "Effects of aloe vera and propolis as feed additives on the production performance of meat dogs", Chinese Journal of Animal Science, vol. 42, No. 5, pp. 33-36, with English-language translation of parts cited in the Sep. 28, 2024 Office Action in counterpart Chinese Application No. CN 202180075931.6.

* cited by examiner

PET FOOD COMPOSITIONS

CROSS-REFERENCE TO RELATED APPLICATIONS

This application is a U.S. National Stage application of PCT/US2021/058777, filed Nov. 10, 2021, which claims the benefit of priority from U.S. Provisional Application No. 63/112,361, filed Nov. 11, 2020, the contents of which are hereby incorporated herein by reference in their entireties.

BACKGROUND

Failure of weight control typically occurs due to either consuming too many calories and not burning those calories, which results in a weight gain, or in an inability to consume enough calories to maintain weight, which results in weight loss.

The well-being of domestic animals may be closely related to their feeding diet. Correct feeding should result in a fit and healthy pet. To achieve correct feeding, one may utilize certain ingredients and concentrations of those ingredients which yield beneficial effects for the animal. Such beneficial effects may include increasing animal body weight, decreasing daily food intake, or both.

It would therefore be desirable to provide a pet food composition which may beneficially affect animals, such as by increasing animal body weight, decreasing food intake, or affecting both.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

Applicants have discovered that utilization of certain ingredients within a pet food composition provides for effective health benefits. In one aspect, the health benefit may be to increase the mass of the animal. In another aspect, the health benefit may be to reduce food intake of the animal. In another aspect, the benefit may be to reduce food intake and increase body weight of the animal. In another aspect, the animal may be a companion animal. In another aspect, the animal may be an elderly animal. In another aspect, the animal may be a canine. Thus, in one aspect, the invention is a pet food composition comprising propolis.

In at least one embodiment, the present invention is directed to a pet food composition comprising propolis present in an amount of about 0.1% or more, based on the total weight of the pet food composition. In certain embodiments, propolis is present of about 0.1% to about 20%, based on the total weight of the pet food composition. In certain embodiments, propolis is present of about 0.5% to about 15%, based on the total weight of the pet food composition. In certain embodiments, propolis is present of about 1% to about 10%, based on the total weight of the pet food composition. In certain embodiments, propolis is present in an amount of about 1% to about 5%, based on the total weight of the pet food composition. In certain embodiments, propolis is present in an amount of about 1% to about 3%, based on the total weight of the pet food composition. In certain embodiments, propolis is present in an amount of about 1% to about 2%, based on the total weight of the pet food composition. In certain embodiments, the composition is substantially free of an antioxidant. In certain embodiments, the composition is free of an antioxidant. In certain embodiments, the composition comprises about 6% to about 12% moisture, based on the total weight of the pet food composition. In certain embodiments, the composition comprises about 65% to about 85% moisture, based on the total weight of the pet food composition. In certain embodiments, the composition further comprises citrus pulp, carrot, rice, spinach, and tomato.

In certain embodiments, the present invention is directed to a composition for reducing food intake of a companion animal, wherein the composition comprises propolis in an amount greater than 0.1%, based on the total weight of the composition. In certain embodiments, the companion animal is a canine or a feline.

In certain embodiments, the present invention is directed to a composition useful in reducing food intake while increasing body weight, wherein the composition comprises propolis in an amount greater than 0.1%, based on the total weight of the composition. In certain embodiments, the companion animal is a canine or a feline.

In certain embodiments, the present invention is directed to a method for reducing food intake of a companion animal, the method comprising feeding the companion animal an effective amount of a pet food composition wherein the pet food composition comprises propolis in an amount of greater than about 0.1%, based on the total weight of the pet food composition. In certain embodiments, the propolis is present in an amount of about 0.1% to about 20%, about 0.5% to about 15%, about 1% to about 10%, about 1% to about 5%, about 1% to about 3%, or about 1% to about 2%, based on the total weight of the pet food composition. In certain embodiments, the composition is substantially free of an antioxidant. In certain embodiments, the composition is free of an antioxidant. In certain embodiments, the composition comprises about 6% to about 12% moisture, based on the total weight of the pet food composition. In certain embodiments, the composition comprises about 65 to about 85 weight % moisture, based on the total weight of the pet food composition. In certain embodiments, the composition further comprises citrus pulp, carrot, rice, spinach, and tomato. In certain embodiments, the companion animal is a canine or a feline.

In further certain embodiments, the present invention is directed to a method for reducing food intake and increasing body weight of a companion animal, the method comprising feeding the companion animal an effective amount of a pet food composition comprising propolis present in an amount greater than about 0.1%, based on the total weight of the pet food composition. In certain embodiments, the propolis is present in an amount of about 0.1% to about 20%, about 0.5% to about 15%, about 1% to about 10%, about 1% to about 5%, about 1% to about 3%, or about 1% to about 2%, based on the total weight of the pet food composition. In certain embodiments, the composition is substantially free of an antioxidant. In certain embodiments, the composition is free of an antioxidant. In certain embodiments, the composition comprises about 6% to about 12% moisture, based on the total weight of the pet food composition. In certain embodiments, the composition comprises about 65% to about 85% moisture, based on the total weight of the pet food composition. In certain embodiments, the composition further comprises citrus pulp, carrot, rice, spinach, and tomato. In certain embodiments, the companion animal is a canine or a feline.

Further areas of applicability of the present invention will become apparent from the detailed description provided hereinafter. It should be understood that the detailed description and specific examples, while indicating the typical embodiments of the invention, are intended for purposes of illustration only and are not intended to limit the scope of the invention.

BRIEF DESCRIPTION OF THE FIGURES

The features, and advantages of the invention will be apparent from the following more detailed description of certain embodiments of the invention and as illustrated in the accompanying drawings in which.

Figure 1:
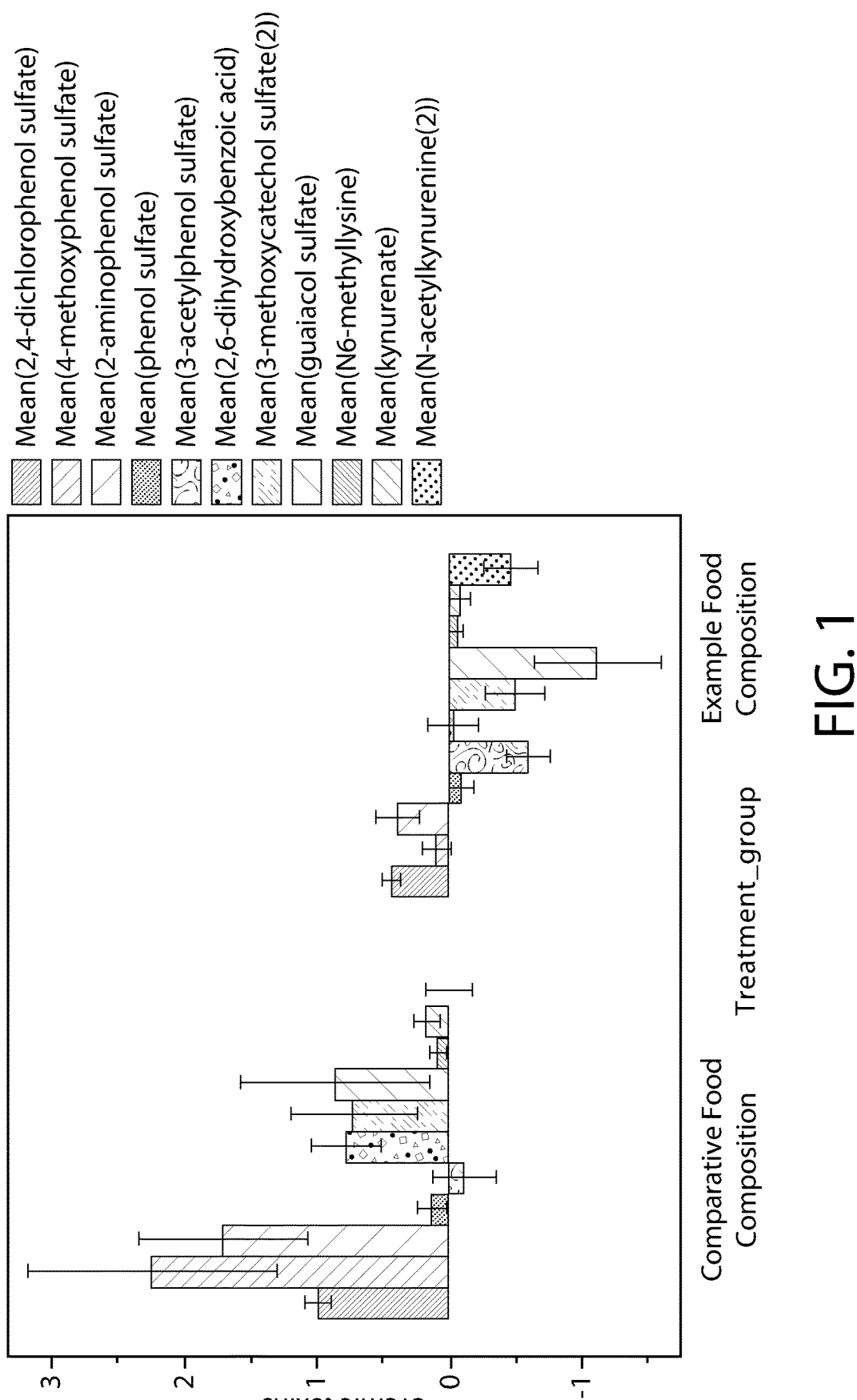
FIG. 1 is a bar graph of the levels of uremic toxins in cats after receiving an exemplary food composition or a comparative food composition in accordance with aspects of the invention.

It should be understood that the various aspects are not limited to the compositions, arrangements, and instrumentality shown in the figures.

DETAILED DESCRIPTION

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other applications and methods. It is to be understood that the invention is not limited in its application to the details of any particular embodiment shown. The terminology used herein is for the purpose of description and not to limit the invention, its application, or uses.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", "containing", and "having" may be used interchangeably. The term "include" should be interpreted as "include, but are not limited to". The term "including" should be interpreted as "including, but are not limited to".

As used throughout, ranges are used as shorthand for describing each and every value that is within the range. Any value within the range can be selected as the terminus of the range. For example, a range of 0.5-6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Unless otherwise specified, all percentages and amounts expressed herein and elsewhere in the specification should be understood to refer to percentages by weight of the total composition. Unless otherwise specified, reference to an ingredient(s) or component(s), being present at a "wt. %" and "weight %" refers to the amount of that ingredient(s) or component(s) present in the composition based on the total weight of the composition. When weight percentages are provided based on the total weight of the composition on a dry matter basis, such weight percentages refers to the weight percentage of that ingredient(s) or component(s) in the composition when excluding water.

According to the present application, use of the term "about" in conjunction with a numeral value refers to a value that may be +/−5% of that numeral. As used herein, the term "substantially free" is intended to mean an amount less than about 5.0 weight % ("wt."), less than 3.0 weight %, 1.0 weight %; preferably less than about 0.5 weight %, and more preferably less than about 0.25 weight % of the composition. As used herein, the term "free" is intended to mean no detectable amount is present.

The terms "pet food composition" mean a composition suitable for ingestion by an animal and preferably a pet. Pet food compositions may include, without limitation, nutritionally balanced compositions suitable for daily feed, as well as supplements and/or treats, which may or may not be nutritionally balanced. The term "nutritionally balanced" means that a composition, such as a pet food composition, has known required nutrients to sustain life in proper amounts and proportions based on recommendations of recognized authorities, including, but not limited to, governmental agencies and the field of pet nutrition. The pet food composition herein may be a dry composition (for example, kibble), semi-moist composition, wet composition, or any mixture thereof. In certain embodiments, the composition may be a supplement, such as a gravy, drinking water, yogurt, powder, suspension, chew, treat (e.g., biscuits) or any other delivery form.

The term "effective amount" indicates that the materials or amount of material is effective to achieve the intended result, such as, but not limited to, preventing, alleviating, or ameliorating one or more symptoms of a disease or health condition.

Unless defined otherwise, all technical and scientific terms used herein have the same meanings as commonly understood by one of ordinary skill in the art to which this invention belongs. All patents, patent applications, publications, and other references cited or referred to herein are incorporated by reference in their entireties for all purposes. In the event of a conflict in a definition in the present disclosure and that of a cited reference, the present disclosure controls.

The present disclosure is directed toward pet food compositions and methods of using such pet food compositions for the treatment of companion pets. In certain embodiments, the pet is a canine. In other embodiments, the canine is elderly. In further embodiments, the pet is a feline. In certain embodiments, the feline is elderly. In certain embodiments, the elderly pet is at least 4, 5, 6, or 7 years old.

The present inventors have surprisingly and unexpectedly discovered that providing animals a pet food diet comprising propolis provides for enhanced health benefit for the animal. Such enhanced health benefit may be exemplified by numerous aspects. In a first aspect, the health benefit may be to increase the body weight of the animal. In another aspect, the health benefit may be to decrease the food intake of the animal. In another aspect, the health benefit may be to both increase the body weight of the animal while concurrently decreasing the food intake of the animal.

In one aspect, the present disclosure therefore provides a pet food composition comprising propolis present in an amount of about 0.1% or more, based on the weight of the pet food composition. In certain embodiments, propolis is present in an amount of about 0.1% to about 20%, based on the total weight of the pet food composition. Some embodiments of the composition may have a reduced amount of antioxidants. The antioxidants that are included in a limited amount or excluded from the composition may be butylated hydroxyanisole ("BHA"), butylated hydroxytoluene ("BHT"), tert-butylhydroquinone ("TBHQ"), vitamin A, vitamin C, vitamin E, carotenoids, tocopherols derivatives thereof, rosemary, grape seed, *curcuma*, mixtures of botanicals, or a combination of two or more thereof. In some embodiments, the pet food composition has a reduced amount of (e.g., is substantially free of or free of) rosemary, grape seed, *curcuma*, or a mixture thereof. In certain embodiments, the pet food composition is substantially free of an antioxidant. For example, the composition may comprise about 3 weight % or less, about 2 weight % or less, about 1 weight % or less, about 0.5 weight % or less, about 0.1 weight % or less, about 0.05 weight % or less, or about 0.01 weight % or less of an antioxidant, based on the total weight of the composition on a dry matter basis. In certain embodiments, the pet food composition is free of an antioxidant.

Propolis is, in general, a glue-like natural resinous substance that honeybees collect from a variety of plant seedlings and buds. Propolis preferably comprises one or more of pollen, flavonoids, polyphenols, terpenoids, or combinations of two or more thereof. For example, the propolis may include flavonoids selected from flavones, flavonols, flavanones, flavanonols, chalcones, dihydrochalcones, isoflavones, isodihydroflavones, flavans, isoflavans, neoflavonoids flavonoid glycosides, and combinations of two or more thereof. Preferably, the propolis comprises one or more flavonoids that provides anti-inflammatory, antiviral, anti-oxidant, anti-cancer, anti-bacterial and anti-allergic properties. In at least one embodiment, the propolis comprises a flavonoids selected from 2-(1-(2-Methylcortonoyloxy)-1-methylethyl)-8-oxo-1, 2-dihydrofurano[2,3-H]2H-chromen, 3-Methyl-but-2-enoicacid,2,2-dimethyl-8-oxo-3, 4-dihydro-2H,8H-pyrano[3,2-g]chromen-3-yl ester, 2H-Cyclopentacyclooctene,4,5,6,7,8,9-hexahydro-1,2,2, 3-tetramethyl, germanicol, dimethyl-1,3,5,6-tetramethyl-[1,3-(13C2)] bicycle, and a combination of two or more thereof. The composition may include propolis comprising one or more terpenoids selected from acyclic monoterpenes, monocyclic monoterpenes, dicyclic monoterpenes, and combinations of two or more thereof. In at least one embodiment, the propolis comprises a terpenoid selected from dodeca-1,3,5,6,8,10-hexaene-9,10-dicarboxylate, spiro[benzo[a]cyclopenta[3,4] cyclobuta[1,2-c]cycloheptene-, 8(5H),2'-[1,3]dioxane], 6,7,7b,10a-tetrahydro-1, 14-Methyl-cholest-7-en-3-ol-15-one, (3α,4α)-4-Methyl-stigmast-22-en-3-ol, and a combination of two or more thereof. The compositions may include one or more polyphenols, such as those capable of chelating metal ions.

Propolis may be present at various amounts or concentrations. In one embodiment, propolis is present in an amount of about 0.1% or more, based on the total weight of the pet food composition. In certain embodiments, propolis is present in an amount of about 0.1% to about 20%, based on the total weight of the pet food composition. For example, propolis may be present in an amount of about 0.1 weight %, 0.5 weight %, 0.8 weight %, 1.0 weight %, about 1.2 weight %, about 1.4 weight %, about 1.6 weight %, about 1.8 weight %, about 2.0 weight %, about 2.2 weight %, about 2.4 weight %, about 2.6 weight %, about 2.8 weight %, about 3.0 weight %, about 3.2 weight %, about 3.4 weight %, about 3.6 weight %, about 3.8 weight %, about 4.0 weight %, about 4.2 weight %, about 4.4 weight %, about 4.6 weight %, about 4.8 weight %, or about 5.0 weight %, about 8.0 weight %, about 10.0 weight %, about 10.5 weight %, about 15.0 weight %, about 17.5 weight %, about 18.0 weight %, or about 20.0 weight %. In another example, propolis may be present in an amount of from about 0.1% to about 10%, about 0.1% to about 7%, about 0.1% to about 5%, or about 0.1% to about 3%, based on the weight of the pet food composition on a dry matter basis. In further embodiments, propolis is present in an amount of about 1% or more, about 2% or more, about 3% or more, about 4% or more, about 6% or more, about 10% or more, or about 15% or more, based on the total weight of the pet food composition on a dry matter basis. In further embodiments, propolis is present in an amount of about 0.1% to about 20%, about 0.1% to about 15%, about 0.1% to about 10%, about 0.1% to about 6%, about 0.1% to about 4%, about 0.5% to about 5%, about 1% to about 15%, about 1% to about 10%, about 1% to about 5%, about 1% to 3%, or about 1% to about 2%, based on the total weight of the pet food composition on a dry matter basis.

The pet food composition may comprise protein and/or a digestible crude protein. "Digestible crude protein" is the portion of protein that is available or can be converted into free nitrogen (amino acids) after digesting with gastric enzymes. In vitro measurement of digestible crude protein may be accomplished by using gastric enzymes such as pepsin and digesting a sample and measuring the free amino acid after digestion. In vivo measurement of digestible crude protein may be accomplished by measuring the protein levels in a feed/food sample and feeding the sample to an animal and measuring the amount of nitrogen collected in the animal's feces.

The protein and/or digestible crude protein of the composition may be present at various amounts or concentrations. In one embodiment, protein may be present in an amount of from about 10% to about 40%, based on the total weight of the pet food composition. For example, protein may be present in an amount of about 10 weight %, about 15 weight %, about 20 weight %, about 25 weight %, about 30 weight %, about 35 weight %, or about 40 weight %. In another example, protein may be present in an amount of from about 10% to about 25%, from about 15% to about 25%, or about 15% to about 20%, based on the total weight of the pet food composition on a dry matter basis. In certain embodiments, protein is present in an amount of about 12% to about 35%, about 13% to about 25%, or about 15% to about 25%, based on the total weight of the pet food composition on a dry matter basis.

A portion of the protein in the composition may be digestible protein. For example, the composition may include an amount of protein, where about 40 weight % or more, about 50 weight % or more, about 60 weight % or more, about 70 weight % or more, about 80 weight % or more, about 90 weight % or more, about 95 weight % or more, about 98 weight % or more, or about 99 weight % or more of the protein is digestible protein. In some embodiments, e.g., when the composition desirable promotes weight loss, the portion of protein that is digestible protein is about 60 weight % or less, about 50 weight % or less, about 40 weight % or less, about 30 weight % or less, about 20 weight % or less, or about 10 weight % or less, based on the total amount of protein in the composition. In further embodiment, the amount of protein that is digestible protein is about 10 to about 99 weight %, about 10 to about 95 weight %, about 10 to about 90 weight %, about 10 to about 70 weight %, about 10 to about 50 weight %, about 10 to about 30 weight %; about 30 to about 99 weight %, about 30 to about 95 weight %, about 30 to about 90 weight %, about 30 to about 70 weight %, about 30 to about 50 weight %; about 50 to about 99 weight %, about 50 to about 95 weight %, about 50 to about 90 weight %, about 50 to about 70 weight %; or about 70 to about 99 weight %, about 70 to about 95 weight %, about 70 to about 90 weight %, including ranges and subranges therein, based on the total amount of protein in the composition.

The compositions of the present invention may optionally comprise additional ingredients suitable for use in pet food compositions. Examples of such ingredients include, but are not limited to, fat, carbohydrates, dietary fibers, amino acids, minerals, trace elements, vitamins, additives.

Carbohydrates can be supplied by any of a variety of sources known by those skilled in the art, including, but not limited to, oat fiber, cellulose, peanut hulls, beet pulp, parboiled rice, corn starch, corn gluten meal, and any combination of those sources. Grains supplying carbohydrates can include, but are not limited to, wheat, corn, barley, and rice. Carbohydrates content of foods can be determined by any number of methods known by those of skill in the art. Generally, carbohydrate percentage can be calculated as nitrogen free extract ("NFE"), which can be calculated as follows: NFE=100%–(moisture %)–(protein %)–(fat %)–(ash %)–(crude fiber %). The amount of carbohydrate, e.g., calculated as NFE, present in the composition may be about 10 to about 90 weight %, about 10 to about 70 weight %, about 10 to about 50 weight %, about 10 to about 40 weight %, about 10 to about 30 weight %, about 10 to about 20 wt. %; about 20 to about 90 weight %, about 20 to about 70 weight %, about 20 to about 50 weight %, about 20 to about 40 weight %; about 30 to about 90 weight %, about 30 to about 70 weight %, about 30 to about 50 weight %, about 30 to about 40 weight %; about 50 to about 90 weight %, about 50 to about 70 weight %; or about 70 to about 90 weight %, based on the total weight of the composition on a dry matter basis.

Dietary fiber refers to components of a plant which are resistant to digestion by an animal's digestive enzymes. Dietary fiber includes soluble and insoluble fibers. Soluble fibers are resistant to digestion and absorption in the small intestine and undergo complete or partial fermentation in the large intestine, e.g., beet pulp, guar gum, chicory root, *psyllium*, pectin, blueberry, cranberry, squash, apples, oats, beans, citrus, barley, or peas. Insoluble fibers can be supplied by any of a variety of sources, including, for example, cellulose, whole wheat products, wheat oat, corn bran, flax seed, grapes, celery, green beans, cauliflower, potato skins, fruit skins, vegetable skins, peanut hulls, and soy fiber. Crude fiber includes indigestible components contained in cell walls and cell contents of plants such as grains, for example, hulls of grains such as rice, corn, and beans. Typical crude fiber amounts in compositions of the present disclosure can be from about 0 to 10 weight %, about 1 to about 5 weight %, about 1 to about 3 weight %, or about 1 to about 2 weight %, based on the total weight of the pet food composition on a dry matter basis.

The pet food composition may comprise a total dietary fiber. The total dietary fiber may be present at various amounts or concentrations. In one embodiment, total dietary fiber may be present in an amount of less than 20%, based on the total weight of the pet food composition. In certain embodiments, the total dietary fiber is present in an amount of about 10% to about 20%, based on the total weight of the pet food composition. For example, total dietary fiber may be present in an amount of about 10.0 weight %, about 10.5 weight %, about 11.0 weight %, about 11.5 weight %, about 12.0 weight %, about 12.5 weight %, about 13.0 weight %, about 13.5 weight %, about 14.0 weight %, about 14.5 weight %, about 15.0 weight %, about 15.5 weight %, about 16.0 weight %, about 16.5 weight %, about 17.0 weight %, about 17.5 weight %, about 18.0 weight %, about 18.5 weight %, about 19.0 weight %, about 19.5 weight %, or about 20.0 weight %. In another example, total dietary fiber may be present in an amount of from about 10% to about 18%, about 12% to about 18%, or about 15% to about 18%, based on the total weight of the pet food composition. In further embodiments, total dietary fiber is present in an amount of about 15% to about 20%, about 16% to about 19%, or about 16% to about 18%, based on the total weight of the pet food composition on a dry matter basis.

Amino acids, including essential amino acids, can be added to the compositions of the present disclosure as free amino acids, or supplied by any number of sources, e.g., crude protein, to the compositions of the present disclosure. Essential amino acids are amino acids that cannot be synthesized de novo, or in sufficient quantities by an organism and thus must be supplied in the diet. Essential amino acids vary from species to species, depending upon the organism's metabolism. For example, it is generally understood that the essential amino acids for dogs and cats (and humans) are phenylalanine, leucine, methionine, lysine, isoleucine, valine, threonine, tryptophan, histidine and arginine. In addition, taurine, while technically not an amino acid but a derivative of cysteine, is an essential nutrient for cats.

The compositions of the present invention may optionally comprise fat. The term "fat" generally refers to a lipid or mixture of lipids that may generally be a solid or a liquid at ordinary room temperatures (e.g., 25° C.) and pressures (e.g., 1 atm). In some instances, the fat may be a viscous liquid or an amorphous solid at standard room temperature and pressure.

Fat can be supplied by any of a variety of sources known by those skilled in the art, including meat, meat by-products, canola oil, fish oil, and plants. Plant fat sources include wheat, flaxseed, rye, barley, rice, sorghum, corn, oats, millet, wheat germ, corn germ, soybeans, peanuts, and cottonseed, as well as oils derived from these and other plant fat sources. The compositions of the present disclosure may contain at least about 9 weight % (or from about 9 to about 25 weight %, or from about 10 to about 20 weight %, or from about 10 to about 15 weight %) of total fat, based on the total weight of the pet food composition. In some cases, the fat in the compositions is crude fat. Crude fat may be included into the compositions in amounts of from about 10 to about 20 weight %, about 10 to about 18 weight %, about 10 to about 16 weight %; about 12 to about 20 weight %, about 12 to about 18 weight %, or about 12 to about 16 weight %, based on the total weight of the composition on a dry matter basis. In some cases, it may be preferable that about 50 weight % or more, about 60 weight % or more, about 70 weight % or more, about 80 weight % or more, or about 90 weight % or more of the total fat is obtained from an animal source. Alternatively, about 50 weight % or more, about 60 weight % or more, about 70 weight % or more, about 80 weight % or more, or about 90 weight % or more of the total fat may be obtained from a plant source.

The compositions of the present disclosure can also contain one or more minerals and/or trace elements, e.g., calcium, phosphorus, sodium, potassium, magnesium, manganese, copper, zinc, chromium, molybdenum, selenium, or iron salts having counterions such as, for example chloride, iodide, fluoride, sulfide or oxide, in amounts required to avoid deficiency and maintain health. These amounts are known by those of skill in the art, for example, as provided in the Official Publication of the Associate of American Feed Control Officials, Inc. ("AAFCO"), Nutrient Requirements of Dogs and Cats, 2006. Typical mineral amounts are about 0.1% to about 4% or about 1% to about 2%.

The compositions of the present invention can also include vitamins in amounts required to avoid deficiency and maintain health. These amounts and methods of measurement are known by those skilled in the art. For example, the Official Publication of the Associate of American Feed Control Officials, Inc. ("AAFCO"), Nutrient Requirements of Dogs and Cats, 2006 provides recommended amounts of such ingredients for dogs and cats. As contemplated herein, vitamins can include, but are not limited to, vitamin A, vitamin $B_1$, vitamin $B_2$, vitamin $B_6$, vitamin $B_{12}$, vitamin C, vitamin D, vitamin E, vitamin H (biotin), vitamin K, folic acid, choline, inositol, niacin, and pantothenic acid. Typical vitamin amounts in the composition of the invention are about from 0 to about 3% or about 1% to about 2%, based on the total weight of the composition on a dry matter basis.

The nutritional components of the pet food composition may be derived from various food sources. As a non-limiting example, proteins, carbohydrates, fat, fiber nutrients and vitamins may be provided for by use of one or more of animal sources such as chicken, beef, and pork, and/or vegetable sources such as corn gluten meal, wheat gluten, gluten, citrus pulp, carrot, rice, spinach, and tomato. In certain embodiments, nutritional components are provided for by utilizing at least citrus pulp, carrot, rice, spinach, and tomato.

The compositions of the present disclosure can additionally comprise other additives, such as palatability enhancers and stabilizers in amounts and combinations familiar to one of skill in the art. Stabilizing substances include, for example, substances that tend to increase the shelf life of the composition. Other examples of other such additives potentially suitable for inclusion in the compositions of the invention include, for example, preservatives, colorants, antioxidants, flavorants, synergists and sequestrants, packaging gases, stabilizers, emulsifiers, thickeners, gelling agents, and humectants. Although the list of foregoing additives may be potentially suitable in some embodiments, one or more of the foregoing additives may be excluded from other embodiments of the composition. Examples of emulsifiers and/or thickening agents include, for example, gelatin, cellulose ethers, starch, starch esters, starch ethers, and modified starches. The concentration of such additives in the composition typically can be up to about 5% by weight, based on the total weight of the composition on a dry matter basis. In some embodiments, the concentration of such additives (particularly where such additives are primarily nutritional balancing agents, such as vitamins and minerals) is from about 0% to about 2.0% by weight, based on the total weight of the composition on a dry matter basis. In some embodiments, the concentration of such additives (again, particularly where such additives are primarily nutritional balancing agents) is from about 0% to about 1.0% by weight, based on the total weight of the composition on a dry matter basis.

The pet food compositions disclosed herein may be wet or dry compositions, and the propolis and other ingredients can be either incorporated into the food composition or on the surface of any composition component, such as, for example, by spraying, agglomerating, dusting, or precipitating on the surface.

In certain aspects, pet food compositions of any consistency or moisture content are contemplated, e.g., the compositions of the present invention can be, for example, a dry, moist or semi-moist animal food composition. "Semi-moist" refers to a food composition containing from about 25 to about 35% moisture. "Moist" food refers to a food composition that has a moisture content of about 60 to 90% or greater. "Dry" food refers to a food composition with about 3 to about 12% moisture content and is often manufactured in the form of small bits or kibbles.

In the pet food industry, foods are generally classified as "wet" or "dry." A wet food has a relatively high amount of water and is usually present in a can or a container wherein air is substantially or totally excluded. Examples of such foods are "chunk and gravy," individual solid particles in the presence of liquid gravy or a loaf type material which generally takes the shape of the receptacle. A dry food is generally a baked or extruded material, the latter then cut into individual shaped portions, usually known as kibbles. Propolis can be readily incorporated into a wet or dry food through conventional means.

In certain embodiments, the pet food composition comprises moisture. The moisture may be present at various amounts or concentrations. In one embodiment, moisture may be present in an amount of from about 5% to about 15%, based on the total weight of the pet food composition. For example, moisture may be present in an amount of about 5.0 weight %, about 5.5 weight %, about 6.0 weight %, about 6.5 weight %, about 7.0 weight %, about 7.5 weight %, about 8.0 weight %, about 8.5 weight %, about 9.0 weight %, about 9.5 weight %, about 10.0 weight %, about 10.5 weight %, about 11.0 weight %, about 11.5 weight %, about 12.0 weight %, about 12.5 weight %, about 13.0 weight %, about 13.5 weight %, about 14.0 weight %, about 14.5 weight %, or about 15.0 weight %. In another example, moisture may be present in an amount of from about 6% to about 12%, about 9% to about 13%, about 9% to about 11%, or about 9% to about 13%, based on the total weight of the pet food composition. In certain embodiments, moisture is present in an amount of about 5% to about 12%, about 6% to about 11%, or about 7% to about 10.0%, based on the total weight of the pet food composition. In further embodiments, moisture is present in an amount of about 65% to about 85%, about 60% to about 80%, or about 60% to about 75%, based on the total weight of the pet food composition.

In certain embodiments, the pet food is in a dry form. In certain embodiments, the pet food is a kibble. In certain embodiments, the kibble is dry. In other embodiments, the kibble comprises moisture.

In certain aspects, the present application further discloses a method of making any of the compositions of the present disclosure. In preparing a composition of the present invention in wet or canned form, any ingredient (e.g., propolis, protein, carbohydrate) generally can, for example, be incorporated into the composition during the processing of the formulation, such as during and/or after mixing of other components of the composition. Distribution of these components into the composition can be accomplished by conventional means. In some embodiments, ground animal and poultry proteinaceous tissues are mixed with the other ingredients, including fish oils, cereal grains, other nutritionally balancing ingredients, special-purpose additives (e.g., vitamin and mineral mixtures, inorganic salts, cellulose and beet pulp, bulking agents, and the like); and water that is sufficient for processing is also added. These ingredients can be mixed in a vessel suitable for heating while blending the components. Heating of the mixture can be effected using any suitable manner, such as, for example, by direct steam injection or by using a vessel fitted with a heat exchanger. Following the addition of the last ingredient, the mixture can be heated to a temperature range of from about 50° F. (10° C.) to about 212° F. (100° C.). In some instances, the mixture can be heated to a temperature range of from about 70° F. (21° C.) to about 140° F. (60° C.). Temperatures outside these ranges are generally acceptable but may be commercially impractical without use of other processing aids. When heated to the appropriate temperature, the material will typically be in the form of a thick liquid. The thick liquid can be filled into cans. When filled into cans, a lid is applied, and the container is hermetically sealed. The sealed can is then placed into conventional equipment designed to sterilize the contents. This is usually accomplished by heating to temperatures of greater than about 230° F. (110° C.) for an appropriate time, which is dependent on, for example, the temperature used and the composition.

Pet food compositions can alternatively be prepared in a dry form using conventional processes. Typically, dry ingredients, including, for example, animal protein, plant protein, grains, etc., are ground and mixed together. Moist or liquid ingredients, including fats, oils, animal protein, water, etc., are then added to and mixed with the dry mix. The mixture is then processed into kibbles or similar dry pieces. Kibble is often formed using an extrusion process in which the mixture of dry and wet ingredients is subjected to mechanical work at a high pressure and temperature, then forced through small openings and cut off into kibble by a rotating knife. The wet kibble is then optionally dried and/or coated with one or more topical coatings which may include, for example, flavors, fats, oils, powders, and the like. Kibble also can be made from the dough using a baking process, rather than extrusion, wherein the dough is placed into a mold before dry-heat processing.

The pet food composition may be administered at a frequency and for a period of time effective to either reduce food intake or reduce food intake and increase body weight of a companion animal that consumes the pet food composition. In certain embodiments, the composition is administered at least once daily, and in certain situations the composition is administered less frequent, such as twice weekly or weekly. In certain embodiments, administration may continue for at least about 1 week, for example at least about 2 weeks, at least about 3 weeks, at least about 1 month, at least about 2 months, at least about 3 months, at least about 4 months, at least about 5 months, at least about 6 months, at least about 1 year, at least about 2 years, or at least about 3 years. In one embodiment, administration continues from a time of initiation for substantially the remainder of the animal's life. Typically, the pet food composition is administered to the companion animal when the companion animal consumes the pet food composition.

In one embodiment, the present disclosure provides a method for reducing food intake of a companion animal, the method comprising feeding the companion animal a pet food composition comprising propolis as described above and within the examples. In preferred embodiments, the reduction in food intake is more than what would occur in the absence of intake of inventive compositions as described herein. In certain embodiments, the change in food intake is at least about 7 g, about 7.7 g, about 8 g, about 9 g or more grams per metabolic body weight.

In another embodiment, the present disclosure provides a method for reducing food intake and increasing body weight of a companion animal, the method comprising feeding the companion animal a pet food composition comprising propolis as described above and within the examples. The method may be used to reduce the advanced glycation end products by at least 10%, preferably at least 20%, preferably at least 25%, or preferably at least 30%, after daily feeding to a pet for 10 or more, 15 or more, or 30 or more days. In preferred embodiments, the reduction in food intake and increase in body weight is more than what would occur in the absence of intake of inventive compositions as described herein. In certain embodiments, the change in food intake is at least about 7 g, about 8 g, about 9 g or more grams per metabolic body weight. In certain embodiments, the increase in body weight is at least about 0.3 kg, about 0.37 kg, about 0.4 kg, about 0.5 kg or more kilograms.

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

Forty senior dogs were fed a pre-trial food during a 30 day pre-feed period. A treatment period was then initiated where the dogs were randomly assigned to one of four groups having 10 dogs each. Each group was then fed a food composition containing either propolis only, antioxidant only, propolis and antioxidant, or none of the two ingredients. These food compositions were fed to the dogs for 30 days. Daily food intake and weekly body weight measurements were taken throughout the study. The average daily intake and metabolic body weight of each dog was calculated with respect to body weight, where metabolic body weight equals the body weight, in kilograms, of the animal to the a power. The food amount was provided so that intake would maintain body weight. The average of the difference in body weight after the prefeed period and the treatment period (Delta body weight) was calculated for each treatment food. Change in food intake per metabolic weight was calculated according to the formula (change in food)/(body weight (Kg)*0.75).

Food compositions were formulated as described in Table 1. Numerical values represent the weight percent of that component, based on the weight of the pet food composition. The compositions contained about 7.4 to 10.3% of moisture.

TABLE 1

| | Dog Food Compositions (wt. %) | | | |
| --- | --- | --- | --- | --- |
| Ingredient | Composition 1 | Composition 2 | Composition 3 | Composition 4 |
| Citrus pulp | 0.6 | 0.6 | 0.6 | 0.6 |
| Carrot | 0.6 | 0.6 | 0.6 | 0.6 |
| Rice | 0.6 | 0.6 | 0.6 | 0.6 |
| Spinach | 0.5 | 0.5 | 0.5 | 0.5 |

TABLE 1-continued

| | Dog Food Compositions (wt. %) | | | |
|---|---|---|---|---|
| Ingredient | Compo-sition 1 | Compo-sition 2 | Compo-sition 3 | Compo-sition 4 |
| Tomato | 0.6 | 0.6 | 0.6 | 0.6 |
| Antioxidant | 0 | 0.02 | 0 | 0.02 |
| Propolis | 0 | 0 | 1.0 | 1.0 |

Example 2

Results of the feeding studies from Example 1 are shown in Table 2.

TABLE 2

| | Results from Canine Feeding Studies | | | |
|---|---|---|---|---|
| | Compo-sition 1 | Compo-sition 2 | Compo-sition 2 | Compo-sition 4 |
| Testing Ingredient | Neither | Antioxidant | Propolis | Propolis + Antioxidant |
| Change in Food Intake/Metabolic Body Weight (g) | −1.3 | 1.6 | −7.7 | −4.9 |
| Change in Body Weight (kg) | 0.20 | 0.07 | 0.37 | 0.14 |

As shown within Table 2, animals fed a pet food composition comprising only propolis showed a repartitioning of energy utilization within senior dogs to support body weight while concurrently reducing the amount of food that animal consumed.

Example 3

Twenty cats, all above the age of 7 years, were evaluated after receiving an exemplary food composition containing propolis or a comparative food compositions for one month to assess the effect of the exemplary food composition on the level of uremic toxins and advanced glycation end products in the cats. Before receiving either the exemplary food composition or comparative composition, the twenty cats underwent a washout period of one month on a maintenance food. The formulation for the exemplary food composition and the comparative food composition are shown in Table 1. Notably, the comparative food composition had the same formulation as the exemplary food composition, except that the comparative food composition did not contain propolis.

TABLE 3

| | Exemplary Food Composition Mean ± SE | Comparative Food Composition Mean ± SE |
|---|---|---|
| Ash | 4.7 | 4.7 |
| Crude protein | 34.4 | 34.4 |
| Crude fat | 14 | 14 |
| Crude fiber | 1.4 | 1.4 |
| Moisture | 7.1 | 7.1 |
| Nitrogen-free extract ("NFE") | 37.4 | 38.4 |
| Propolis | 1 | |

The twenty cats were randomly assigned into two groups to receive the exemplary food composition containing propolis or the comparative food composition containing no propolis for one month. Samples were collected at the end of the washout period and at the end of the feeding period for plasma metabolomics. The changes in the levels of each metabolite at the end of the feeding period from the levels after the washout period (end of feeding–end of washout) were compared to evaluate statistical differences in levels of metabolites associated with the feeding.

The food containing propolis led to significant reductions (P<0.05) in the plasma concentrations of the uremic toxins including 2,4-dichlorophenol sulfate, 4-methoxyphenol sulfate, 2-aminophenol sulfate, phenol sulfate, 3-acetylphenol sulfate, 2,6-dihydroxybenzoic acid, 3-methoxycatechol sulfate, guaiacol sulfate, N6-methyllysine, kynurenate, and N-acetylkynurenine. Table 4 shows the average levels of each of the foregoing uremic toxins after a month of receiving either the exemplary food composition or comparative composition.

TABLE 4

| | Exemplary Food Composition Mean ± SE | Comparative Food Composition Mean ± SE | P-value |
|---|---|---|---|
| 2,4-dichlorophenol sulfate | 0.43 ± 0.067 | 0.98 ± 0.1 | <0.0001 |
| 4-methoxyphenol sulfate | 0.09 ± 0.1 | 2.24 ± 0.94 | 0.03 |
| 2-aminophenol sulfate | 0.39 ± 0.16 | 1.7 ± 0.64 | 0.02 |
| phenol sulfate | −0.096 ± 0.088 | 0.12 ± 0.12 | 0.05 |
| 3-acetylphenol sulfate | −0.6 ± 0.16 | −0.11 ± 0.24 | 0.01 |
| 2,6-dihydroxybenzoic acid | −0.03 ± 0.19 | 0.77 ± 0.26 | 0.03 |
| 3-methoxycatechol sulfate | −0.5 ± 0.22 | 0.72 ± 0.48 | 0.02 |
| guaiacol sulfate | −1.12 ± 0.48 | 0.86 ± 0.72 | 0.02 |
| N6-methyllysine | −0.06 ± 0.05 | 0.09 ± 0.06 | 0.008 |
| kynurenate | −0.08 ± 0.07 | 0.16 ± 0.1 | 0.02 |
| N-acetylkynurenine | −0.47 ± 0.21 | −0.003 ± 0.17 | 0.04 |

As seen in FIG. 1, the exemplary food composition led to a significant decrease in uremic toxins.

Figure 2:
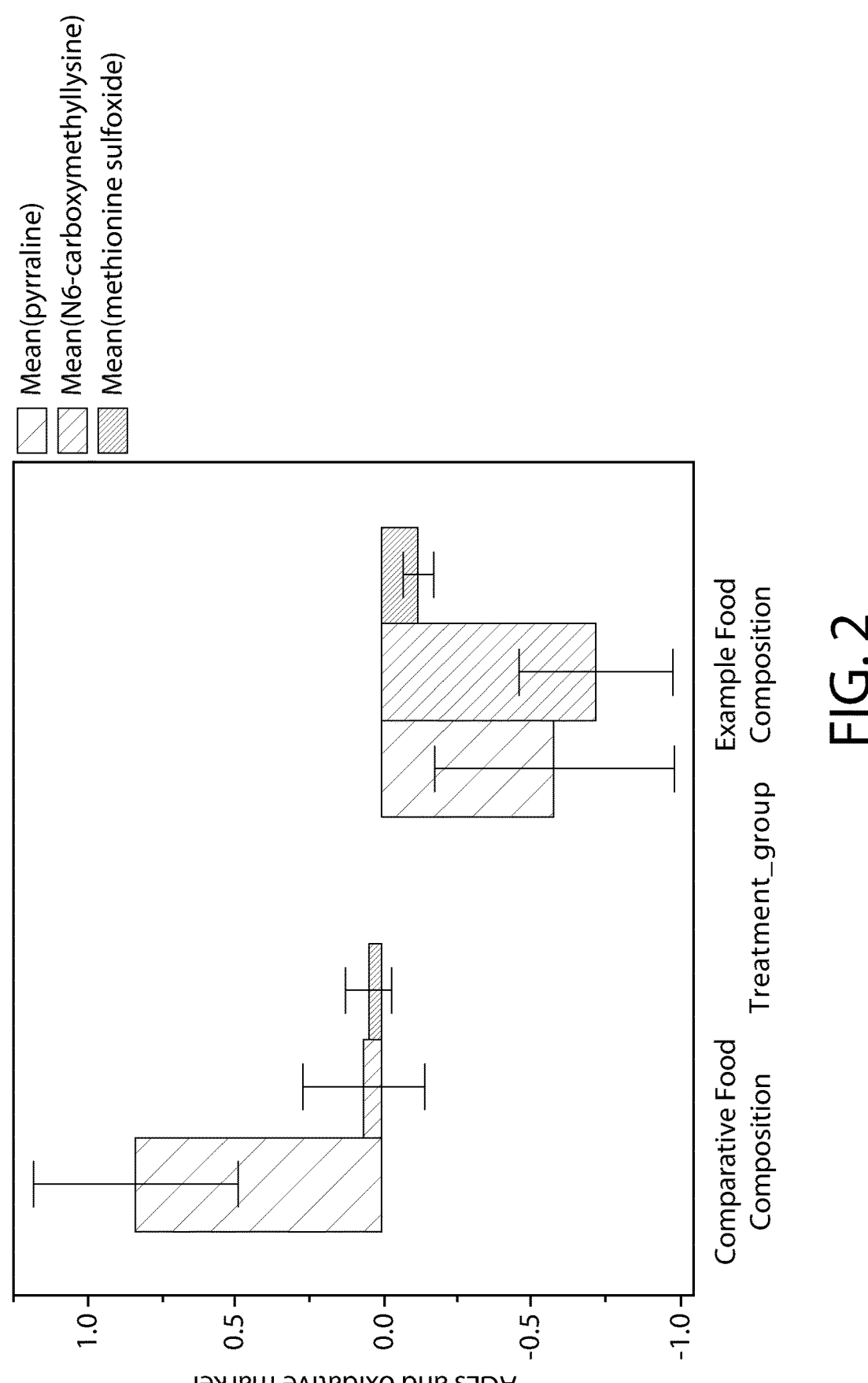
FIG. 2 is a bar graph of the levels of advanced glycation end products in cats after receiving an exemplary food composition or a comparative food composition according to aspects of the invention.

The levels of advanced glycation endpoints ("AGEs") for the cats were also determined and evaluated. AGEs are formed by the glycation of amino acids such as lysine. The increased accumulation of AGEs in blood is associated with aging, various disease conditions and oxidative stress. As seen in Table 5, provided below, the cats that received the exemplary food composition had a significant reduction in the plasma concentrations of AGEs-namely, pyrraline (P=0.0014) and N6-carboxymethyllysine (CML) (P=0.0029). The exemplary food composition also led to a significant reduction in an oxidative stress marker, methionine sulfoxide (P=0.0265). FIG. 2 shows the significant reduction in AGEs and oxidative marker for the cats that received the exemplary food composition.

TABLE 5

| | Exemplary Food Composition Mean ± SE | Comparative Food Composition Mean ± SE | P-value |
|---|---|---|---|
| Pyrraline | −0.58 ± 0.4 | 0.84 ± 0.35 | 0.0014 |
| N6-carboxymethyllysine ("CML") | −0.72 ± 0.26 | 0.06 ± 0.21 | 0.0029 |
| Methionine sulfoxide | −0.12 ± 0.05 | 0.05 ± 0.08 | 0.0265 |

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. A method for reducing food intake of a companion animal, the method comprising feeding the companion animal an amount of a pet food composition to achieve a reduction in food intake of at least about 7 grams per metabolic body weight, wherein the pet food composition comprises propolis in an amount of about 0.1 wt. % to about 3 wt. %, based on the total weight of the pet food composition on a dry matter basis.

2. A method for reducing food intake and increasing body weight of a companion animal, the method comprising feeding the companion animal an amount of a pet food composition to achieve a reduction in food intake of at least about 7 grams per metabolic body weight and an increase in body weight of at least about 0.3 kilograms, wherein the pet food composition comprises propolis in an amount of about 0.1 wt. % to about 3 wt. %, based on the total weight of the pet food composition on a dry matter basis.

3. The method of claim 2, wherein the companion animal is a canine or a feline.

4. The method of claim 2, wherein the propolis is present in an amount of from about 1 to about 3 wt. %, based on the total weight of the pet food composition on a dry matter basis.

5. The method of claim 2, wherein the propolis comprises pollen, a flavonoid, a polyphenol, a terpenoid, or a combination thereof.

6. The method of claim 5, wherein the flavonoid is selected from flavones, flavonols, flavanones, flavanonols, chalcones, dihydrochalcones, isoflavones, isodihydroflavones, flavans, isoflavans, neoflavonoids flavonoid glycosides, or a combination thereof.

7. The method of claim 5, wherein the flavonoid is selected from 2-(1-(2-Methylcortonoyloxy)-1-methylethyl)-8-oxo-1, 2-dihydrofurano[2,3-H]2H-chromen, 3-Methyl-but-2-enoicacid,2,2-dimethyl-8-oxo-3, 4-dihydro-2H,8H-pyrano[3,2-g]chromen-3-yl ester, 2H-Cyclopentacyclooctene,4,5,6,7,8,9-hexahydro-1,2,2, 3-tetramethyl, germanicol, dimethyl-1,3,5,6-tetramethyl-[1, 3-(13C2)]bicycle, or a combination thereof.

8. The method of claim 5, wherein the terpenoid comprises an acyclic monoterpene, a monocyclic monoterpene, a dicyclic monoterpene, or a combination thereof.

9. The method of claim 5, wherein the terpenoid is selected from dodeca-1,3,5,6,8,10-hexaene-9,10-dicarboxylate, spiro[benzo[a]cyclopenta[3,4]cyclobuta[1,2-c]cycloheptene-, 8(5H),2'-[1,3]dioxane], 6,7,7b,10a-tetrahydro-1, 14-Methyl-cholest-7-en-3-ol-15-one, (3α,4α)-4-Methyl-stigmast-22-en-3-ol, or a combination thereof.

10. The method of claim 5, wherein the propolis comprises pollen and one or more of a flavonoid, a polyphenol, and a terpenoid.

11. The method of claim 2, wherein the pet food composition is substantially free of at least one of butylated hydroxyanisole, butylated hydroxytoluene, tert-butylhydroquinone, vitamin A, vitamin C, vitamin E, carotenoids, tocopherols, and derivatives thereof.

12. The method according to claim 2, wherein the pet food composition comprises from about 6 to about 12 wt. % of moisture, based on the total weight of the pet food composition.

13. The method according to claim 2, wherein the pet food composition comprises about 65 to about 85 wt. % of moisture, based on the total weight of the pet food composition.

14. The method according to claim 2, wherein the pet food composition further comprises citrus pulp, carrot, rice, spinach, and tomato.

15. The method according to claim 2, wherein the pet food composition further comprises about 10 to about 40 wt. % of protein, based on the total weight of the pet food composition, wherein about 10 to about 99 wt. % of the protein is a digestible protein.

16. The method according to claim 2, wherein the pet food composition further comprises about 9 to about 25 wt. % of a fat, based on the total weight of the pet food composition on a dry matter basis, wherein:

about 50 wt % or more of the total fat is obtained from an animal source; or about 50 wt % or more of the total fat is obtained from a plant source.

17. The method according to claim 2, wherein the pet food composition further comprises about 10 to about 90 wt. % of a carbohydrate, based on the total weight of the pet food composition on a dry matter basis.

* * * * *